Dec. 22, 1953 H. D. CHALLEN 2,663,394
CLUTCH FOR POWER PRESSES
Filed Nov. 2, 1951 2 Sheets-Sheet 1

INVENTOR
Henry Denis Challen
By Harris & Bateman
ATTORNEYS

Dec. 22, 1953   H. D. CHALLEN   2,663,394
CLUTCH FOR POWER PRESSES
Filed Nov. 2, 1951   2 Sheets-Sheet 2

INVENTOR
Henry Denis Challen
By Harris & Pittman
ATTORNEYS

Patented Dec. 22, 1953

2,663,394

UNITED STATES PATENT OFFICE 2,663,394

CLUTCH FOR POWER PRESSES

Henry Denis Challen, Birmingham, England, assignor to Taylor & Challen Limited, Birmingham, England, a British company Application November 2, 1951, Serial No. 254,594

3 Claims. (Cl. 192—26)

1

This invention has reference to improvements relating to clutches for power presses and is directed particularly to clutches of the kind generally known as key clutches wherein the driving member of the clutch takes the form of a clutch ring mounted about the driven member, said driven member having a radially disposed spring loaded key adapted to engage a notch on the internal periphery of the clutch ring under the action of the spring, the setting of said key being determined by a cam plate which can be moved axially relative to the driven member so as to be in or out of the path of motion of the key.

It has been found in practice that when the clutch ring of such a clutch is rotating above a predetermined speed, then unless the notch in the ring is substantially wider than the engaging portion of the key in the direction of rotation, insufficient time is permitted for the spring loading of the key to fully assert itself before the key is struck by the driving face of the notch with the result that excessive wear or fouling of the key and/or driving face takes place. Further, if the notch in the clutch ring is substantially wider in the direction of rotation than the engaging portion of the key, clatter and resulting wear takes place when sudden resistance, such as obtains in presses, is applied to the driven member.

The object of the present invention is to overcome the aforesaid defects and to this end according to the present invention the clutch ring is provided adjacent the notch with a spring loaded plunger the spring loading whereof is of lesser power than the spring loading of the key and the inner end whereof is adapted to project into the notch so as to latch the projecting end of the key in contact with the driving face of the clutch ring.

Figure 1:
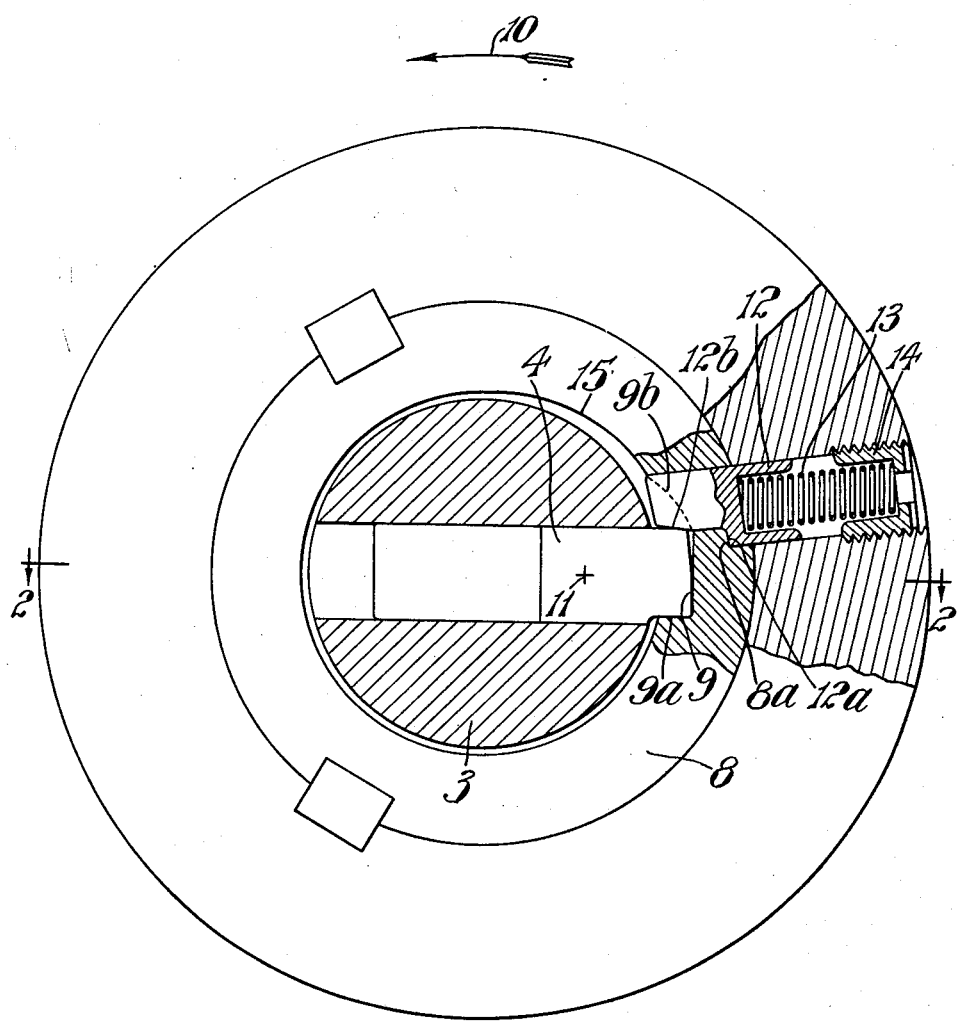
Figure 2:
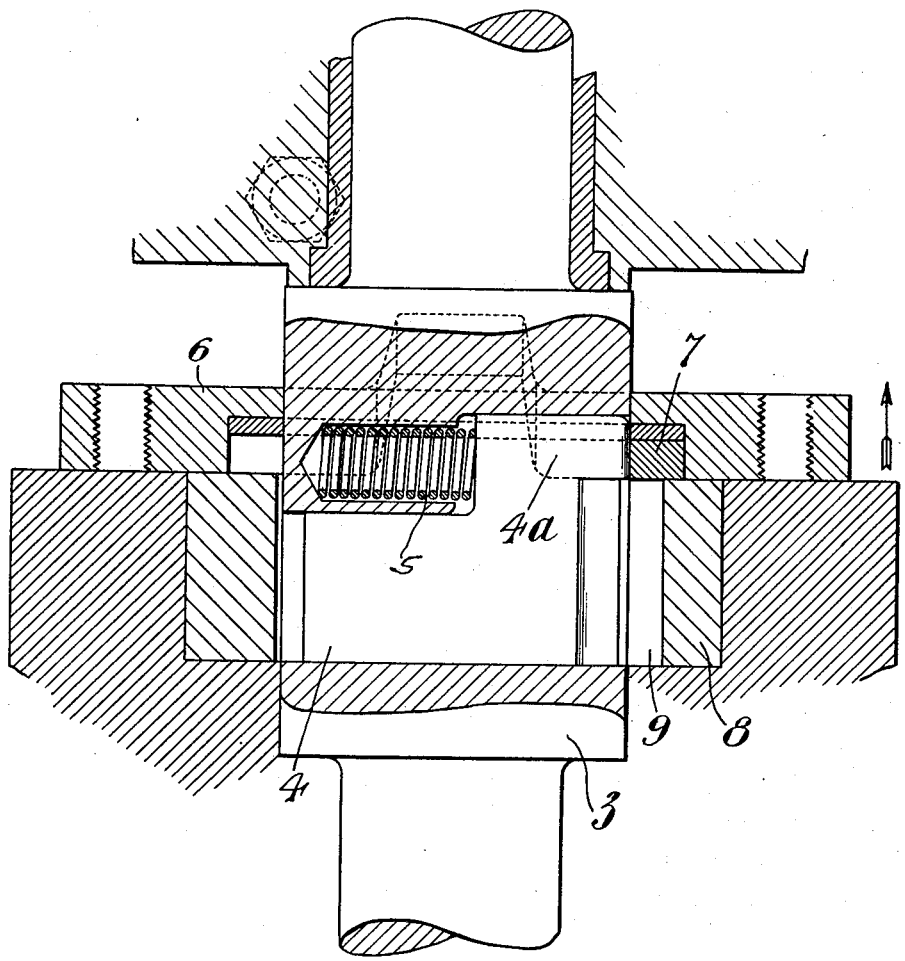

By way of example an embodiment of the present invention will now be described with particular reference to the accompanying drawings in which:

Figure 1 is a part sectional view of the clutch ring and contained portion of a driven shaft 6 showing the clutch in the engaged position, and Figure 2 is a section on the line 2—2 of Figure 1 looking in the direction of the arrows but showing the clutch in the disengaged position.

In the embodiment illustrated the driven member follows normal practice and comprises a shaft 3 in which is radially disposed and slideable a spring loaded key 4, the spring loading whereof is shown at 5 and tends to move the key so that

2 its outer end protrudes radially from the periphery of the shaft 3. Also in accordance with normal practice there is provided a cam plate 6 which is axially movable relative to the shaft 3 so that it can be moved either into or clear of the path of motion permitted to a portion 4ª of the key 4. When it is positioned so as to be in the path of motion of the part 4ª of the key as shown in Figure 2 of the drawings then a cam segment 7 due to rotation of the shaft within the plate 6 moves the key radially into the shaft 3 against the action of the spring 5 so that it does not protrude from the shaft. The clutch ring 8 which is the driving member of the clutch is rotatably mounted about that portion of the shaft 3 containing the key 4 and is furnished on its inner periphery with a notch 9 into which the outer end of the key is adapted to engage to provide the driving connection between the clutch ring 8 and the shaft 3. The notch 9 has a flat wall 9ª which is the following wall in the direction of rotation of the clutch ring 8 (as illustrated by the arrow 10) which is hardened to form a driving face. The mechanism so far described is well known in the art and forms no part of the present invention which consists of the modifications hereinafter described.

According to the present invention the notch 9 is of a width in the direction of rotation of the clutch ring 8, greater than the width of the portion of the key 4 which is adapted to engage therein and the leading wall 9ᵇ of the notch in the direction of rotation is arcuate and is struck from a centre 11. Through this arcuate wall 9ᵇ is adapted to project the inner end of a spring loaded plunger 12 which is slidably mounted in the clutch ring 8 on an axis slightly inclined to a radius thereof, the spring loading being shown at 13 held in position by the cup screw 14. This plunger 12 is provided with a shoulder 12ª which co-operates with a shoulder 8ª in the clutch ring in limiting the inward travel of the plunger and the spring loading 13 of the plunger 12 is of lesser power than the spring loading 5 of the key 4. When the plunger is in its innermost position seen in Figure 1 then a portion 12ᵇ of the side of the plunger forms a wall of the notch 9 substantially parallel to the driving face 9ª thereof and spaced therefrom by a distance substantially equivalent to the width of the outer end of the driving key if measured in the direction of rotation.

In operation when the cam plate 6 is moved to allow the spring loading 5 of the key 4 to assert itself, then the key bears against the inner periphery of the clutch ring 8 which is rotating. As the notch 9 in the clutch ring comes into a position opposite the key 4, the key first bears against the inner end of the plunger 12 overcoming the spring loading 13 of the plunger and moving outwardly as permitted by the arcuate wall 9b of the notch until it is finally struck by the driving face 9a of the notch, whereupon the plunger 12 is free to move inwardly and latch the key in position.

If desired the inner periphery of the clutch ring may be furnished with a tangential lead for the key into the notch as seen at 15.

I claim:

1. A key clutch for power presses comprising in combination a shaft, a radially slidable key in said shaft, a spring for urging said key outwardly from the shaft, a clutch ring surrounding the part of the shaft containing the key having on its inner periphery a notch of a width greater than the outer end of the key measured in the direction of rotation, a plunger slidable in the clutch ring and positioned so that its inner end can project into the notch to limit the width of the notch in the direction of rotation to a width substantially equal to the outer end of the key, a spring for urging said plunger inwardly having a power less than the power of the spring for urging the key outwardly and a cam plate axially movable about the shaft whereby the key can be retained from entering the notch in the clutch ring.

2. A key clutch as defined in claim 1, wherein the leading wall of the notch in said clutch ring is arcuate so as to admit of said key moving outwardly against the action of the spring loading of said plunger before the key is contacted by the driving face of the clutch ring.

3. A key clutch as defined in claim 1, wherein the inner periphery of said clutch ring has a tangential lead for said key into said notch.

HENRY DENIS CHALLEN.

References Cited in the file of this patent

UNITED STATES PATENTS

| Number | Name | Date |
|---|---|---|
| 901,590 | Butlin | Oct. 20, 1908 |

FOREIGN PATENTS

| Number | Country | Date |
|---|---|---|
| 590,044 | Great Britain | 1947 |